(12) United States Patent
Fältén et al.

(10) Patent No.: US 11,067,046 B2
(45) Date of Patent: Jul. 20, 2021

(54) VENT FUEL HANDLING ASSEMBLY FOR A GAS ENGINE POWER PLANT AND METHOD OF RECOVERING VENT FUEL GAS FROM A GAS ENGINE POWER PLANT

(71) Applicant: WÄRTSILÄ FINLAND OY, Vaasa (FI)

(72) Inventors: Stefan Fältén, Vaasa (FI); Jan Krooks, Vaasa (FI)

(73) Assignee: WÄRTSILÄ FINLAND OY, Vaasa (FI)

(*) Notice: Subject to any disclaimer, the term of this patent is extended or adjusted under 35 U.S.C. 154(b) by 211 days.

(21) Appl. No.: 16/458,738

(22) Filed: Jul. 1, 2019

(65) Prior Publication Data
US 2019/0323464 A1   Oct. 24, 2019

Related U.S. Application Data

(63) Continuation of application No. PCT/FI2016/050933, filed on Dec. 29, 2016.

(51) Int. Cl.
*F02M 21/02* (2006.01)
*F02D 19/02* (2006.01)
(Continued)

(52) U.S. Cl.
CPC .......... *F02M 55/007* (2013.01); *F02D 41/30* (2013.01); *F02M 21/0221* (2013.01); *F02M 21/0224* (2013.01)

(58) Field of Classification Search
CPC .......... F02M 21/0221; F02M 21/0224; F02M 21/0293; F02M 21/0242; F02M 55/007;
(Continued)

(56) References Cited

U.S. PATENT DOCUMENTS

2006/0204909 A1   9/2006 Malm
2014/0116375 A1   5/2014 Kim et al.
(Continued)

FOREIGN PATENT DOCUMENTS

KR   20160013548 A   2/2016
WO   2016061698 A1   4/2016

OTHER PUBLICATIONS

International Preliminary Report on Patentability issued in corresponding International Patent Application No. PCT/FI2016/050933, 33 pages (dated Dec. 11, 2018).
(Continued)

*Primary Examiner* — Phutthiwat Wongwian
*Assistant Examiner* — Arnold Castro
(74) *Attorney, Agent, or Firm* — Buchanan Ingersoll & Rooney PC

(57) ABSTRACT

The present disclosure relates to a vent fuel handling assembly and method of operation for a gas engine power plant, which can include a vent fuel recovery piping provided with at least one recovery piping for recovering vent fuel source, a vessel connected to the vent fuel recovery piping for storing the fuel recovered via the at least one inlet opening, and a compressor connected to the vessel at the inlet side of the compressor via a discharge piping so as to subject underpressure to the vessel and discharge gas from the vessel. The compressor is connected to the gas engine at the outlet side of the compressor via the discharge piping so as to feed the recovered gas to the engine for combustion therein.

14 Claims, 3 Drawing Sheets

(51) Int. Cl.
*F02D 19/06* (2006.01)
*F02D 41/00* (2006.01)
*F02M 55/00* (2006.01)
*F02D 41/30* (2006.01)

(58) Field of Classification Search
CPC .............. F02D 41/0027; F02D 41/30; F02D 2200/0602; F02D 19/027; Y02T 10/30
See application file for complete search history.

(56) References Cited

U.S. PATENT DOCUMENTS

| | | |
|---|---|---|
| 2014/0150753 A1 | 6/2014 | Foege |
| 2016/0230718 A1* | 8/2016 | Moras .................... F01M 13/00 |
| 2017/0082041 A1* | 3/2017 | Hirose .................... F02B 43/02 |
| 2017/0314513 A1* | 11/2017 | Oversby ............ F02M 21/0224 |

OTHER PUBLICATIONS

International Search Report and Written Opinion issued in corresponding International Patent Application No. PCT/FI2016/050933, 11 pages (dated Mar. 8, 2017).

* cited by examiner

VENT FUEL HANDLING ASSEMBLY FOR A GAS ENGINE POWER PLANT AND METHOD OF RECOVERING VENT FUEL GAS FROM A GAS ENGINE POWER PLANT

RELATED APPLICATION

This application claims priority as a continuation application under 35 U.S.C. § 120 to PCT/FI2016/050933 filed as an International Application on Dec. 29, 2016 designating the U.S., the entire content of which is hereby incorporated by reference in its entirety.

FIELD

The present disclosure relates a vent fuel handling assembly for a gas engine power plant and method of recovering vent fuel gas from a gas engine power plant.

BACKGROUND INFORMATION

Today, stringent regulations for greenhouse gas emissions cause new challenges to power plant set-up and design of gas operated power plants, particularly gas operated internal combustion engine power plant. Gaseous fuel handling assemblies have a phenomenon associated with them called venting. Venting can occur for a variety of reasons. For example, a pressure relief valve for a cryogenic storage vessel storing a liquefied gaseous fuel can be activated when vapor pressure within the vessel rises above a safety limit and vent gas is admitted. The gas engine power plants may be equipped with several vents for fuel gases and hydrocarbon vapors for venting gas in various circumstances. Such vent gas is in a worst case vented directly to the atmosphere causing greenhouse gas emissions and the power plants are therefore zoned as hazardous areas. New energy solutions are introducing fuel gases containing heavier hydrocarbons, with density higher than air. This creates more challenges to handle fuel gases properly.

The document WO2016061698 A1 discloses a vent handling apparatus for a gaseous fuel handling assembly of an internal combustion engine. It includes an accumulator for storing gaseous fuel, a valve enabling fluid communication between the accumulator and one of a gaseous fuel communication passage and a gaseous fuel storage vessel, the gaseous fuel communication passage delivering gaseous fuel to the internal combustion engine for combustion and an apparatus for returning the gaseous fuel from the accumulator to the internal combustion engine for combustion.

The document US2014116375 A1 discloses a compression ignited dual fuel engine and a strategy to avoid atmospheric venting. Rather than venting the fuel gas to atmosphere, the surplus gas can be burned in the engine when operating conditions present burn opportunities.

The document US2006204909 A1 discloses an apparatus and method for collecting fugitive combustible gases and adding the gases as a supplementary fuel source to an engine. The fugitive combustible gases are added to the air inlet to the air supply and a control is provided to allow adjustment of the normal fuel supplied to the engine following the addition of the fugitive combustible gases. The fugitive combustible gases provide an energy source for the engine and the combustion of the gases reduces the greenhouse effect if the gases contain methane.

A problem relating to known solutions is that recovering of vent gas is still insufficient.

The present disclosure provides a vent fuel handling assembly and method of recovering vent fuel in which the recovering of the vent gas is considerably improved compared to known solutions.

SUMMARY

A gas engine power plant is disclosed, comprising: at least one gas operated generator set having a gas engine; a vent fuel handling assembly having a vent fuel recovery piping provided with at least one inlet; a vessel connected to the vent fuel handling assembly; and a compressor connected to the gas engine of the power plant for feeding gas to the gas engine for combustion therein; the vent fuel handling assembly having a vent fuel recovery piping provided with at least one inlet configured to collect vent fuel from a source of vent fuel in an engine room of the power plant; the vessel being configured to maintain underpressure of less than prevailing surroundings atmospheric pressure, connected to the first inlet of the vent fuel recovery piping for storing fuel recovered via the at least one inlet; and the compressor being connected to the vessel via a discharge piping at an inlet side of the compressor to provide underpressure to the vessel and discharge gas from the vessel.

A method of recovering vent fuel gas from a gas engine power plant is also disclosed, comprising at least one gas engine and a vent fuel handling assembly, the method comprising: arranging a vent fuel handling assembly having a vent fuel recovery piping provided with at least one inlet and at least one vessel connected to the vent fuel recovery piping; maintaining an underpressure of less than prevailing surroundings atmospheric pressure in the vessel by a compressor; collecting vent fuel to the vent fuel recovery piping via at least one inlet from an engine room of the power plant, and conveying the vent fuel to the vessel by the underpressure maintained in the vessel; conveying the vent fuel from the vessel to a compressor power plant; increasing pressure of the vent fuel in the compressor; and feeding the vent fuel to the engine from the compressor for combustion therein.

BRIEF DESCRIPTION OF THE DRAWINGS

In the following discussion, the invention will be described with reference to the accompanying exemplary, schematic drawings of various embodiments, wherein.

DETAILED DESCRIPTION

Figure 1:
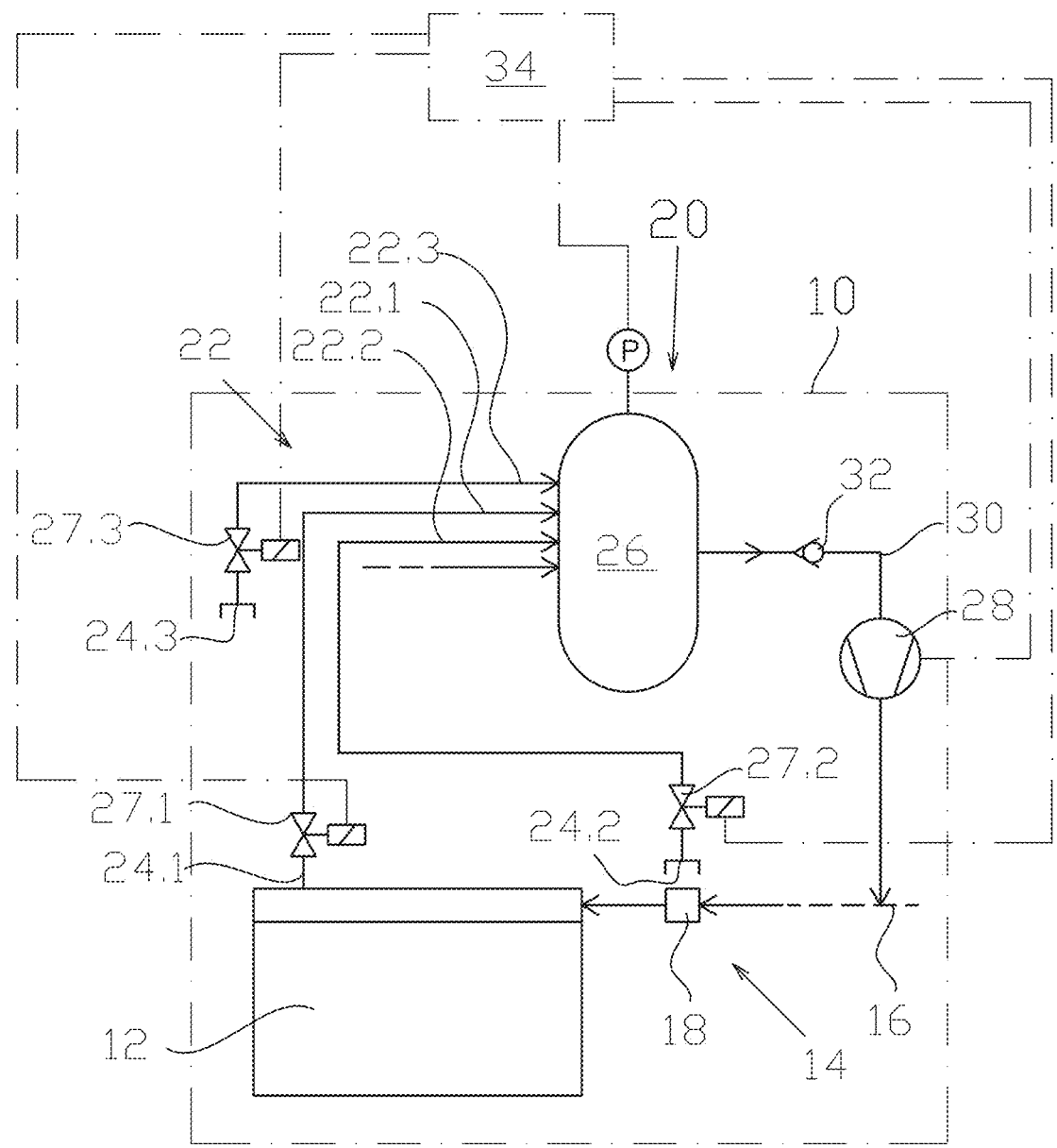
FIG. 1 illustrates a vent fuel handling assembly according to an exemplary embodiment disclosed herein.

According to an exemplary embodiment a vent fuel handling assembly for a gas engine power plant can include:
  a vent fuel recovery piping provided with at least one inlet for recovering vent fuel from a vent fuel source,
  a vessel connected to the vent fuel recovery piping for storing the fuel recovered via the at least one inlet opening, and
  a compressor connected to the vessel at the inlet side of the compressor via a discharge piping so as to subject underpressure to the vessel and discharge gas from the vessel, wherein the compressor is connected to the gas engine at the outlet side of the compressor via a discharge piping so as to feed the recovered gas to the engine for combustion therein.

According to an exemplary embodiment, the vent fuel handling assembly can include a control system configured to monitor pressure in the vessel, and control operation of the compressor such that the pressure in the vessel is maintained within predetermined pressure range lower than the atmospheric pressure.

According to an exemplary embodiment, the fuel recovery piping can include at least one fuel recovery pipe provided with a control valve to selectively open or close flow communication between the vessel and the at least one inlet opening.

According to an exemplary embodiment, the control system can be configured to close and open the at least control valve and to start and stop the compressor independently from each other.

According to an exemplary embodiment, a volume of the vessel can be equal to or more than the total volume of the recovery piping.

According to an exemplary embodiment, at least two engines are provided with a dedicated vent fuel handling assembly which share the pressure vessel, the discharge piping and the compressor.

According to an exemplary embodiment, the volume of the vessel can be at least 5 $m^3$ per each engines connected to the vessel.

According to an exemplary embodiment, the vent fuel recovery piping can be provided with an inlet connected to the engine, and/or to the vent fuel handling assembly of the engine and/or in connection with an engine room housing the engine.

An exemplar method of recovering vent fuel gas from a gas engine power plant includes:
  collecting vent fuel to a vent fuel recovery piping via at least one inlet,
  conveying the vent fuel in the fuel recovery piping to a vessel connected to the vent fuel recovery piping for storing the fuel recovered,
  controlling an underpressure in the vessel for facilitating the conveyance of the vent fuel to the vessel,
  conveying the vent fuel from the vessel to an engine in the power plant,
  increasing the pressure of the vent fuel, and
  feeding the vent fuel to the engine for combustion therein.

According to an exemplary embodiment, the pressure in the vessel can be monitored and the pressure maintained within predetermined pressure range lower than the atmospheric pressure.

According to an exemplary embodiment, each occurrence of conveying the vent fuel in the fuel recovery piping to a vessel can be controlled to have a duration during which the volume of the gas entering the vessel equals at least the volume of an active part of the fuel recovery piping.

According to an exemplary embodiment, collecting the vent fuel to the recovery piping can be controlled by operating at least one control valve in the recovery piping and thus selectively opening or closing flow communication between the vessel and the at least one inlet opening.

According to an exemplary embodiment, underpressure in the vessel can be controlled by starting and stopping a compressor connected to the vessel.

According to an exemplary embodiment, underpressure in the vessel can be controlled by starting and stopping a compressor connected to the vessel independently from closing and opening the at least control valve in the vent fuel recovery piping.

According to an exemplary embodiment, the vent fuel recovery piping can be provided with inlet connected to the engine, and/or to the vent fuel handling assembly of the engine and/or in connection with an engine room housing the engine.

According to an exemplary embodiment, a first engine of the power plant can be running and a second engine of the power plant shut down and vent fuel is recovered from the second engine and is combusted in the first engine.

Thus, exemplary embodiments re-circulate vented gas. Practically the vent gas can be totally recovered for combustion in the power plant. By making use of the underpressure in the vessel the recovering can be very efficient due to obtainable gas flow rate in the recovery piping. By means of the vessel where an underpressure is maintained, it is possible to operate the vent fuel handling system in a versatile but simultaneously reliable manner.

Exemplary embodiments presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in the appended claims.

FIG. 1 depicts schematically an exemplary vent fuel handling assembly for a gas engine operated power plant 11, i.e. a gas engine power plant. The power plant 11 includes at least one gas operated internal combustion engine which engine includes a gaseous fuel feeding system 14. The gas engine includes a coupling and a generator thus forming a so called generator set 12. In this connect the generator set is simply called as an engine 12. The engine is operated by combusting the gaseous fuel. The engine 12, the gaseous fuel feeding system 14 and/or the power plant 11, which may be also referred to as an engine room can include certain parts from which so called venting can occur and from which venting gas may be safely and reliably recovered according to exemplary embodiments. The engine 12 can be connected to an electric grid which is not shown here. The power plant 11, which is also called as a gas engine power plant, can include more than one engine 12 in a common engine room, which is also referred to with the reference number 10 in the following.

There is a vent fuel handling assembly 20 arranged in connection with the engine 12 provided for handing the vent fuel from the engine 12, the gaseous fuel feeding system 14 and/or the engine room 10. The assembly 20 includes a vent fuel recovery piping 22 via which the vent fuel may be recovered and recycled as disclosed herein. The piping can include one or more flow channels provided with at least one inlet 24.1, 24.2, 24.3 for recovering vent fuel. Depending on a source of the vent fuel the practical implementation of the inlet may be different but advantageously each source of vent fuel is provided with an inlet for recovering vent fuel. In FIG. 1 the first inlet 24.1 is directly connected to the fuel feeding system of the engine and it may be connected in gas tightly manner to a pressure relief valve (not shown) of the gaseous fuel feeding system 14. The second inlet 24.2 is configured to collect vent fuel from a gas regulating valve unit 18 of the gaseous fuel feeding system 14. The third inlet 24.3 is configured to collect vent fuel from a preselected location of the engine room 10.

Further the vent fuel assembly 20 includes a vessel 26 configured to withhold underpressure in the vessel 26. The vessel may be constructed as a pressure vessel being of circular cross section and dome-like end parts. The pressure vessel is connected to the vent fuel recovery piping 22 such that the vent fuel may conveyed into the vessel 26 via the vent fuel recovery piping 22. In FIG. 1 each one of the inlets are provided with a dedicated recovery pipe 22.1 . . . 22.3 from the inlet to the vessel 26, thus the fuel recovery piping 22 includes more than one separate, parallel pipes 22.1 . . . 22.3. Each one of the pipes is provided with a control valve 27.1 . . . 27.3 by means of which the flow connection between the respective inlet and the vessel 26 may be selectively opened and closed according to a predetermined control scheme.

The assembly can include a compressor 28. The compressor 28 is connected to the vessel 26 at the inlet side thereof via a discharge piping 30. The discharge piping 30 opens into the vessel 26 and is provided with a one-way valve 32 allowing gas flow only in the direction from the vessel 26 to the compressor 28 so as to subject underpressure to the vessel 26 and discharge gas from the vessel 26. The compressor 28 is connected to the gas engine 12 at the outlet side of the compressor 28 so as to feed recovered gas to the engine for combustion therein. More particularly, the discharge piping 30 is connected a gas fuel header 16 of the engine 12.

The volume of the vessel 26 and the volume of the fuel recovery piping 22 are interdependent from each other. Advantageously the volume of the vessel 26 can be more than the volume of the recovery piping 22 between the inlet 24.N and the control valve 27.N. This way when performing the venting it is possible ensure that all the fuel is at side of the vessel 26, behind the control valve 27.N in the recovery piping and therefore may not escape back to the environment.

Contrary to the illustration in FIG. 1, the control valves 27.N may also be arranged in the vicinity of the pressure vessel 26 in which the volume of the recovery piping 22 between the inlet 24.N and the control valve 27.N is increased and therefore the volume of the vessel is increased.

It has been discovered that in order to perform in an adequate manner, the volume of the vessel 26 should be at least 5 m3 per each engine connected to the vessel 26.

The vent fuel handling assembly 20 can include a control system 34. The control system is configured to monitor the pressure in the vessel 26 measured by a probe provided into the vessel. Additionally the control system 34 is configured to control the operation of the compressor 28 such that the pressure P in the vessel 26 is maintained within predetermined pressure range, which range is lower than the atmospheric pressure. This provides the effect of providing gas flow into the inlet 24.1 . . . 24.3 when the control valve 27.1 ...27.3 is open. Thus, it is possible to collect the vent fuel at least to some extent regardless of the running condition of the engine 12. The control system 34 is also configured to close and open the at least control valve 27.1 . . . 27.3 and to start and stop the compressor 28 independently from each other.

During operation of the vent fuel handling assembly the vent fuel is firstly collected to the vent fuel recovery piping 22 via at least one inlet 24.1 . . . 24.3. Collecting of the vent fuel to the recovery piping is controlled by operating at least one of the control valves in the recovery piping 22 and thus selectively opening or closing flow communication between the vessel 26 and the at least one inlet opening 24.1 . . . 274.3.

Depending on the case, one or more of the control valves 27.1 . . . 27.3 may be opened. The vent fuel is conveyed in the fuel recovery piping 22 to the vessel 26 by way of the underpressure provided in the vessel. The vent fuel may also be temporarily stored in the vessel. This may take place either when the engines are shut down or even when the engines are running. The underpressure in the vessel is controlled by controlling operation of the compressor 28 for facilitating the conveyance of the vent fuel to the vessel. The compressor 28 may be operated intermittently and the pressure in the vessel 26 is allowed to increase when the compressor is not working and when at least one of the control valves is open. Respectively when the compressor is operating the pressure in the vessel is decreased. Thus, the underpressure in the vessel 26 can be controlled by starting and stopping the compressor 28. The range within which the pressure p in the vessel 26 is maintained is 60 kPa$<p<p_{atm}$, where $p_{atm}$ is a prevailing surrounding;s atmospheric pressure. The gas which has been conveyed to the vessel 26 is further conveyed to at least one gas engine in the power plant combusted therein. The gas is pressurized in the compressor 28 in order to increase the pressure to the level required or desired for introduction in the engine. The combination of the pressure range and the volume of the vessel affects the operation cycle of the compressor.

According to exemplary embodiments, when the conveying of the vent gas is not continuous, each occurrence of conveying the vent fuel in the fuel recovery piping to a vessel can be controlled to have a duration set such that during the occurrence the volume of the gas entering the vessel equals at least the volume of an active part of the fuel recovery piping. As explained earlier the active part of the volume is the volume of the pipe 22.1 . . . 22.1 between the control valve 27.1 . . . 27.3 and the inlet 24.1 . . . 24.3. It is also possible to maintain a control valve continuously open.

The underpressure in the vessel 26 may be controlled by starting and stopping a compressor connected to the vessel independently from closing and opening the at least control valve in the vent fuel recovery piping 22.

In an exemplary method the fuel gas may be recirculated from the vent fuel handling assembly gas back to an engine in the power plant. The assembly may be also operated such that a first engine of the power plant is running and a second engine of the power plant is shut down and vent fuel is collected from the second engine, which is shut down and is combusted in the first engine. This way, when venting the gas fuel feeding system of an engine for example before maintenance work of a standstill engine, the vent fuel may be utilized in another running engine.

Figure 2:
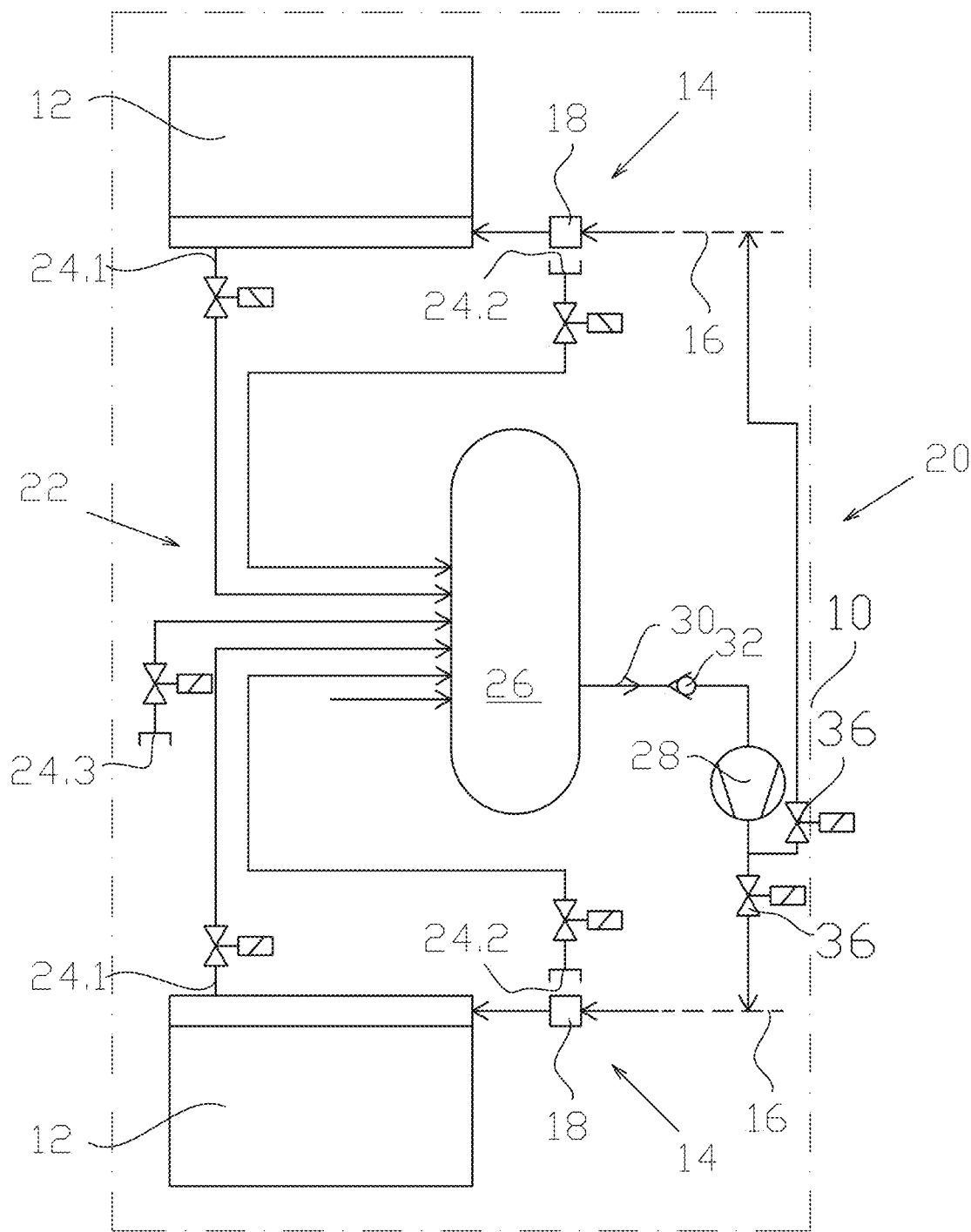
FIG. 2 illustrates a vent fuel handling assembly according to another exemplary embodiment disclosed herein.

In FIG. 2 there is shown an exemplary embodiment where two engines 12 are provided with a vent fuel handling assembly 20 which share a common pressure vessel 26, discharge piping 30 and the compressor 28. The discharge piping 30 is branched such that there is a branch discharge pipe leading to each one of the engines 12, for example to the gas fuel header 16. The branch discharge pipes are provided with control valves 36 or a three way valve by means of which it is possible to select into which engine the recovered vent fuel is led. Thus the assembly can be operated such that a first engine 12 of the power plant is running and a second engine of the power plant is shut down and vent fuel is recovered from the second engine or from both of the engines. The recovered vent fuel can be combusted in the first engine while the second one is in standstill state.

Figure 3:
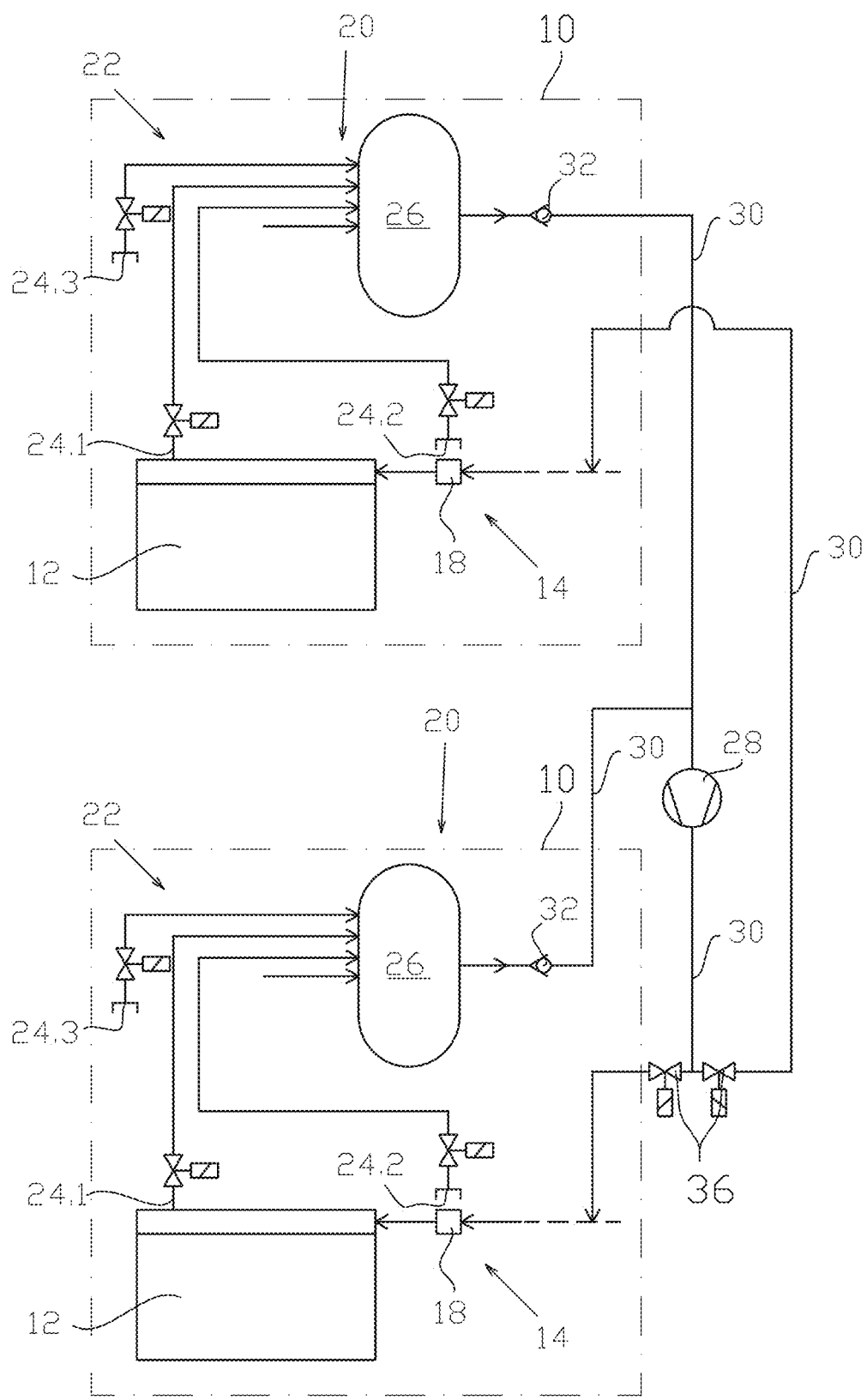
FIG. 3 illustrates a vent fuel handling assembly according to still another exemplary embodiment disclosed herein.

In FIG. 3 an exemplary embodiment includes two engines 12 provided with a vent fuel handling assembly 20 which share a common discharge piping 30 and the compressor 28. In contrast to FIG. 2 the vent fuel assembly includes separate or dedicated pressure vessel 26 for each engine 12. In this embodiment the discharge piping 30 is branched such that there is a branch discharge pipe leading to each one of the engines 12, in particular to the gas fuel header 16. The branch discharge pipes are provided with control valves 36 or a three way valve by which it is possible to select into which engine the recovered vent fuel is led. In this embodiment the assembly can be operated such that a first engine 12 of the power plant is running and a second engine of the power plant is shut down and vent fuel is recovered from the second engine or from both of the engines. The recovered vent fuel is combusted in the first engine while the second one is in standstill mode. This embodiment can be considered to have a distributed pressure vessel 26 which still basically acts like one. The assembly can also be provided with separate compressors for each pressure vessel 26 and still be capable of directing the recovered vent fuel to be combusted in the first engine while the second one is in standstill state.

It is also possible to combine the vent fuel handling assemblies of FIGS. 2 and 4 such that one or more compressor(s) provide underpressure to several pressure vessels which may serve one or more engines.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A gas engine power plant, comprising:
at least one gas operated generator set having a gas engine;
a vent fuel handling assembly having a vent fuel recovery piping provided with at least one inlet;
a vessel connected to the vent fuel handling assembly; and
a compressor connected to the gas engine of the power plant for feeding gas to the gas engine for combustion therein;
the vent fuel handling assembly having a vent fuel recovery piping provided with at least one inlet configured to collect vent fuel from a source of vent fuel in an engine room of the power plant;
the vessel being configured to maintain underpressure of less than prevailing surroundings atmospheric pressure, connected to the first inlet of the vent fuel recovery piping for storing fuel recovered via the at least one inlet; and
the compressor being connected to the vessel via a discharge piping at an inlet side of the compressor to provide underpressure to the vessel and discharge gas from the vessel.

2. A gas engine power plant according to claim 1, wherein the vent fuel recovery piping comprises:
at least a first inlet, a second inlet and a third inlet configured to collect vent fuel from a source of vent fuel in the engine room.

3. A gas engine power plant a according to claim 2, wherein the first inlet is connected to a fuel feeding system of the engine, the second inlet is configured to collect vent fuel from a gas regulating valve unit of the fuel feeding system, and the third inlet is configured to collect vent fuel from a preselected location of an engine room.

4. A gas engine power plant according to claim 1, wherein the vent fuel handling assembly comprises:
a control system configured to monitor pressure in the vessel, and control operation of the compressor such that pressure in the vessel is maintained within a predetermined pressure range lower than atmospheric pressure.

5. A gas engine power plant according to claim 4, the vent fuel recovery piping comprises:
at least one fuel recovery pipe provided with a control valve to selectively open or close flow communication between the vessel and the at least one inlet, and wherein the control system is configured to close and open the at least one control valve and to start and stop the compressor independently from each other.

6. A gas engine power plant according to claim 1, the vent fuel recovery piping comprises:
at least one fuel recovery pipe provided with a control valve to selectively open or close flow communication between the vessel and the at least one inlet, and wherein the control system is configured to close and open the at least one control valve and to start and stop the compressor independently from each other.

7. A gas engine power plant according to claim 1, wherein a volume of the vessel is equal to or more than a total volume of the recovery piping.

8. A gas engine power plant according to claim 1, wherein the power plant comprises:
two engines which share the pressure vessel, the discharge piping and the compressor of the vent fuel handling assembly.

9. A method of recovering vent fuel gas from a gas engine power plant comprising at least one gas engine and a vent fuel handling assembly, the method comprising:
arranging a vent fuel handling assembly having a vent fuel recovery piping provided with at least one inlet and at least one vessel connected to the vent fuel recovery piping;
maintaining an underpressure of less than prevailing surroundings atmospheric pressure in the vessel by a compressor;
collecting vent fuel to the vent fuel recovery piping via at least one inlet from an engine room of the power plant, and conveying the vent fuel to the vessel by the underpressure maintained in the vessel;
conveying the vent fuel from the vessel to a compressor power plant;
increasing pressure of the vent fuel in the compressor; and
feeding the vent fuel to the engine from the compressor for combustion therein.

10. The method of recovering vent fuel gas from a gas engine power plant according to claim 9, comprising:

controlling each occurrence of conveying the vent fuel in the fuel recovery piping to a vessel to have a duration during which a volume of the gas entering the vessel equals at least a volume of an active part of the fuel recovery piping.

11. The method of recovering vent fuel gas from a gas engine power plant according to claim 9, comprising:
controlling a collecting of the vent fuel to the vent fuel recovery piping by operating at least one control valve in the vent fuel recovery piping and thus selectively opening or closing flow communication between the vessel and at least one inlet.

12. The method of recovering vent fuel gas from a gas engine power plant according to claim 9, comprising:
controlling the underpressure in the vessel starting and stopping a compressor connected to the vessel independently from closing and opening the at least control valve in the vent fuel recovery piping.

13. The method of recovering vent fuel gas from a gas engine power plant according to claim 9, comprising:
providing the vent fuel recovered via piping to an inlet connected to the engine, and to the vent fuel handling assembly of the engine in connection with an engine room housing the engine.

14. The method of recovering vent fuel gas from a gas engine power plant according to claim 9, wherein a first engine of the power plant is running and a second engine of the power plant is shut down, the method comprising:
recovering vent fuel from the second engine for combustion in the first engine.

* * * * *